(12) United States Patent
Griggs

(10) Patent No.: US 8,423,582 B2
(45) Date of Patent: Apr. 16, 2013

(54) DATABASE MESSAGE BUILDER

(75) Inventor: Ryan Griggs, San Jose, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 12/687,026

(22) Filed: Jan. 13, 2010

(65) Prior Publication Data

US 2011/0173238 A1 Jul. 14, 2011

(51) Int. Cl.
*G06F 17/30* (2006.01)

(52) U.S. Cl.
USPC ......................................... 707/802; 707/828

(58) Field of Classification Search .................. 707/802, 707/828
See application file for complete search history.

(56) References Cited

U.S. PATENT DOCUMENTS

| | | | | |
|---|---|---|---|---|
| 2002/0152208 A1* | 10/2002 | Bloedorn | ........................... | 707/6 |
| 2003/0033589 A1* | 2/2003 | Reyna et al. | .................... | 717/109 |
| 2003/0154446 A1* | 8/2003 | Constant et al. | ............... | 715/531 |
| 2005/0021646 A1* | 1/2005 | Kumar | ........................... | 709/206 |
| 2007/0244859 A1* | 10/2007 | Trippe et al. | ...................... | 707/3 |
| 2008/0147812 A1* | 6/2008 | Curtis | ........................... | 709/206 |
| 2008/0222546 A1* | 9/2008 | Mudd et al. | .................... | 715/765 |

* cited by examiner

*Primary Examiner* — Son T Hoang
(74) *Attorney, Agent, or Firm* — Fish & Richardson P.C.

(57) ABSTRACT

A database message builder presents a message building window on a user interface of a database application for retrieving structured data from one or more fields of a database record of the database and unstructured data (e.g., free form text) entered by a user of the database application. The message building window can be used to build database messages using a variety of structured and unstructured data. One or more tokens corresponding to the structured data in the database (e.g., database record fields) can be used in the window to build a database message. The user can publish the message to a target application or network resource (e.g., a social networking site). Prior to publication, the tokens can be replaced with corresponding structured data from the record fields. A current character count or character limit for the selected target application or network resource can be displayed in the user interface.

24 Claims, 5 Drawing Sheets

US 8,423,582 B2

DATABASE MESSAGE BUILDER

TECHNICAL FIELD

The subject matter is related generally to computer databases.

BACKGROUND

Computer databases are traditionally used for the storage, organization, and retrieval of large amounts similarly themed, structured information. For example, a contact database generally store information relating to one or more people's personal information (e.g., name, address, telephone number), whereas a collector's database (e.g., baseball cards, comic books, stamps) generally stores information such as the collectable items' names, descriptions, values, etc.

Social networks are generally Internet-based services that act as online gathering places. Users can associate (e.g., network) themselves with other users of the services to share information such as photos, blog posts, and personal status updates. Some social networks cater almost exclusively to providing users with tools for broadcasting personal updates on a frequent basis, for example, to notify their social networking peers about what is happening in their lives.

SUMMARY

A database message builder presents a message building window on a user interface of a database application for retrieving structured data from one or more fields of a database record of the database and unstructured data (e.g., free form text) entered by a user of the database application. The message building window can be used to build database messages using a variety of structured data, including but not limited to text, media, files, links, location coordinates, dynamic content and any other structured data that can be stored in a structured database. One or more tokens corresponding to the structured data in the database (e.g., database record fields) can be used in the window to build a database message. The user can publish the message to a target application or network resource (e.g., a social networking site). Prior to publication the tokens can be replaced with corresponding structured data from the record fields. A current character count or character limit for the selected target application or network resource can be displayed.

The details of one or more embodiments are set forth in the accompanying drawings and the description below. Other features and advantages will be apparent from the description and drawings, and from the claims.

BRIEF DESCRIPTION OF THE DRAWINGS

This document describes these and other aspects in detail with reference to the following drawings.

Like reference symbols in the various drawings indicate like elements.

DETAILED DESCRIPTION

Example User Interfaces

Figure 1:
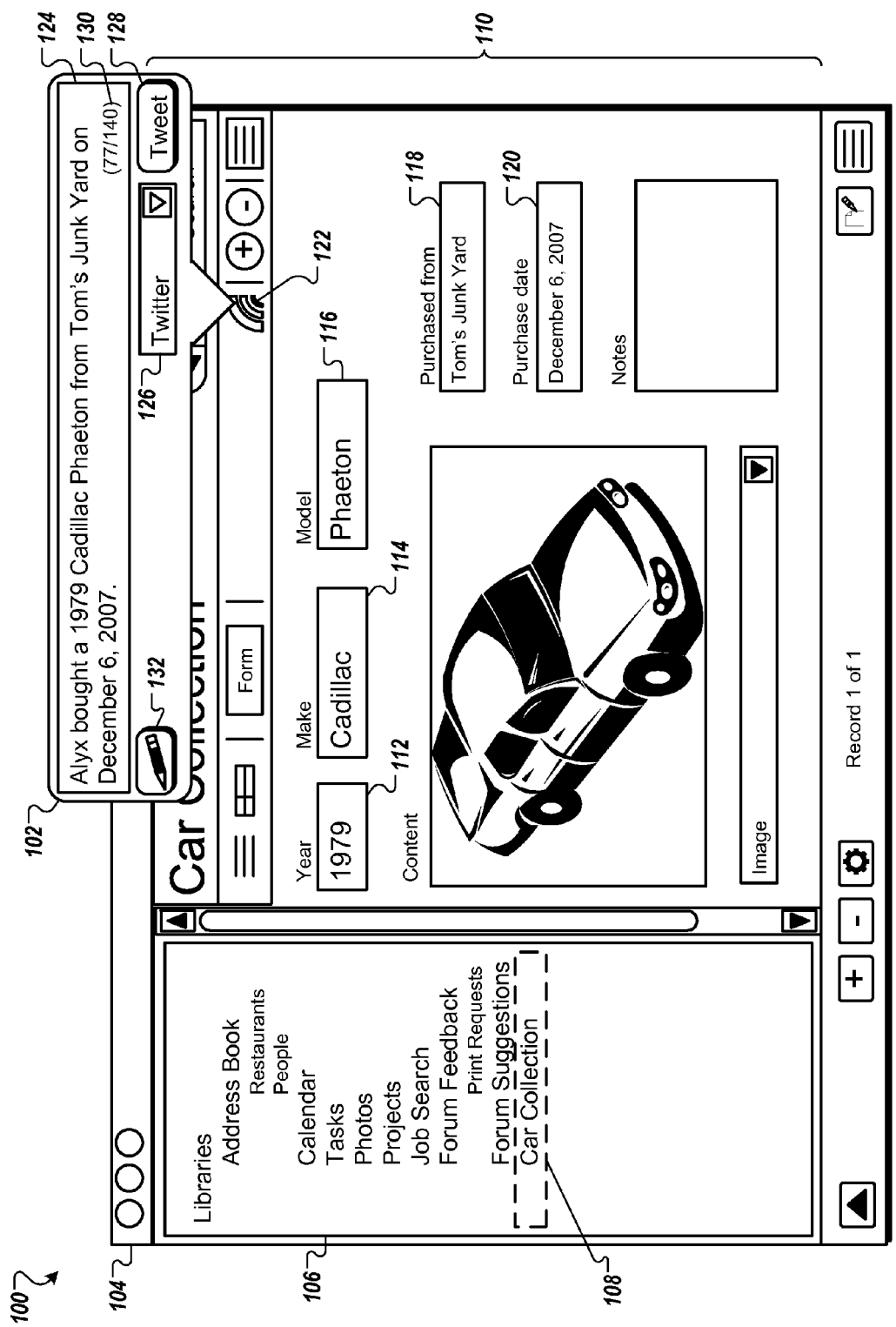
FIG. 1 shows an example user interface for a database application that includes a database message builder interface in a text editing mode.

FIG. 1 shows an example user interface 100 for a database application that includes a database message builder interface 102 in a text editing mode. In general, the database message builder interface 102 provides a user with tools for combining unstructured data (e.g., free-form text) with structured data retrieved from a database records, and submitting the combined unstructured data and structured data to an application such as email, text or instant messaging (e.g., SMS), or a network resource such as a social networking website. The examples that follow use text and text strings as examples of unstructured and structured data. However, any unstructured and structured data can be used with the database message builder.

The database application user interface 100 can include a main window 104. The main window 104 can provide a collection of user interface elements that give a user the tools needed to input, organize, query, browse, and/or view the content of a database. For example, the main window can include a list control 106 that shows a collection of items representative of databases that can be accessed through the database application user interface 100. In the illustrated example, the user has selected an item 108 that represents a car collection database.

A form interface region 110 can provide user interface elements that the user can manipulate to interact with the content of a database. In the illustrated example, the form interface region 110 is laid out to present interface elements associated with the fields of a car collection database. In some examples, the car collection database can include multiple records, each record representing a car, and each record including various fields for storing information related to the car such as the year, make, model an data and location of purchase. The form interface region can include a year input box 112, a make input box 114, a model input box 116, a "purchased from" input box 118, and a purchase date input box 120. These input boxes can have correspondingly record fields in the car collection database.

The database application user interface 100 can include a database message builder button 122. When the database message builder button 122 is activated by the user, the database message builder interface 102 is displayed. In some implementations, the database message builder interface 102 can be a pop-up or balloon dialog, as illustrated in FIG. 1. In other implementations, the database message builder interface 102 can be a sub-region of the database application user interface 100. For example, the database message builder interface 102 can occupy an area of the database application user interface 100 that is visible all or most of the time. In another example, the database message builder interface 102 can occupy an area that is visible only when needed, such as a drawer control that opens or extends inward or outward from an edge of the database application user interface 100 when activated and can then close or shut when the user is finished.

In some implementations, database message building functionality can be included in an application using an Application Programming Interface (API) in place of the user interface 102. The API can allow a programmer to access database message builder methods and classes according to call conventions defined by a database message builder API specification.

The database message builder interface 102 can include an input box 124. The input box 124 can be a user interface control that can be used by the user to input, edit, and view text-based information. The user can combine free form, unstructured text with structured text retrieved from fields of the database by interacting with the input box 124. For example, the unstructured text elements, "Alyx bought a," "from," "on," as well as spaces and punctuation marks, can be combined with the structured text elements "1979," "Cadillac," "Phaeton," "Tom's Junk Yard," and "Dec. 6, 2007" retrieved from the database. Other examples of such uses will be discussed further in the descriptions of FIGS. 2 and 3.

A selector control 126 can be provided so the user can select a target application or network resource to receive the message of combined structured and unstructured text displayed in the input box 124. For example, the selector control 126 can provide the user with selections for popular social networking services such as Twitter™, Facebook™, LinkedIn™, or MySpace™. The selector control 126 can also provide the user with selections for applications, such as email, instant messaging, text messaging (e.g., SMS), word processing, a clipboard, or other application that can accept text input.

An activation button 128 can be included to initiate a transmission of the combined text to the selected service or application. In the illustrated example, the user can press the activation button 128, and the combined text "Alyx bought a 1979 Cadillac Phaeton from Tom's Junk Yard on Dec. 6, 2007," will be sent (e.g., "tweeted") to the Twitter social network service. In another example, if an email application is selected using the selector control 126, the activation button 128 can initiate the creation of a new email message that can be pre-populated with the combined text.

A counter indicator 130 displays a count of the total characters in the combined text string, the maximum number of characters allowed by the selected target service or application, or both. For example, the Twitter service can allow users to submit strings of 140 characters maximum, the Facebook service can allow a 1000 character limit, and SMS messages can be 160 characters long, whereas an email application may present no practical limit on the number of characters that may be used.

In some implementations, the counter indicator 130 can provide the user with feedback that may be useful while the user is editing the combined structured and unstructured text. For example, the counter indicator 130 can help the user avoid sending combined text that exceeds the target service's or application's maximum allowable character limit, which may result in the service or application rejecting the string, returning an error, truncating the string at the allowable limit, or some other possibly undesirable result.

Figure 2:
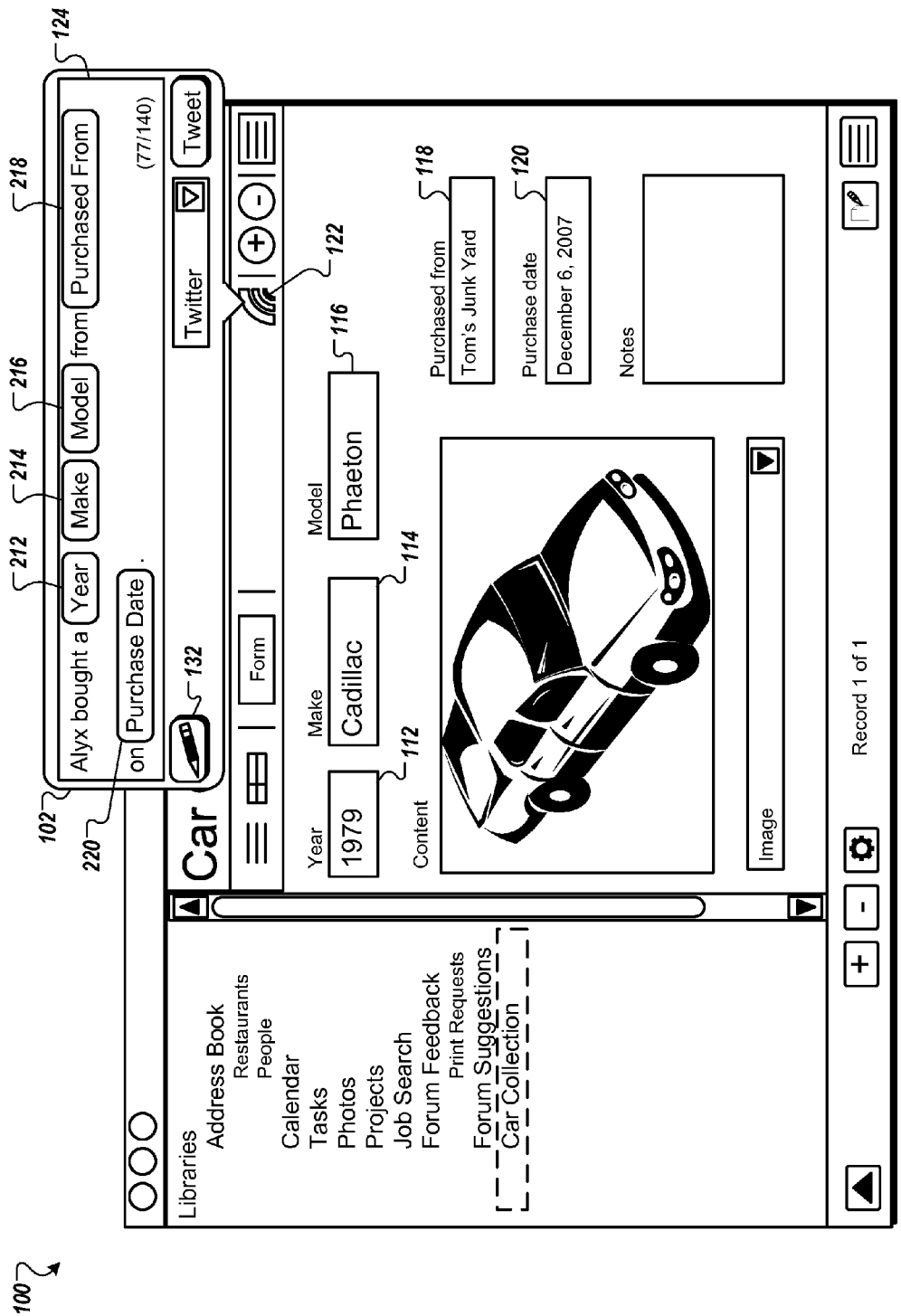
FIG. 2 shows another view of the example database application user interface where the database message builder interface is in a token editing mode.

In some implementations, a toggle button 132 can be selected to toggle the database message builder interface 102 into a token editing mode, as is illustrated by and discussed in the description of FIG. 2.

FIG. 2 shows another view of the example database application user interface 100 where the database message builder interface 102 is in a token editing mode.

While in the token editing mode, the database message builder interface 102 can present the structured text as a collection of tokens 212-220 (e.g., visual placeholders for information retrieved from the database). In some implementations, the tokens 212-220 can be visually differentiated from unstructured text. For example, the tokens 212-220 can be displayed using a different font, color, background, or with some other modification that can make them visually distinguishable from the unstructured text. In some implementations, the tokens 212-220 can be indicative of the database fields they represent. For example, the token 212 is labeled with the word "Year," and represents the content of the "year" field of the database, the token 214 labeled "Make" represents the content of the "make" field, and so on.

In some implementations, the user can place the tokens in the input box 124 by dragging and dropping the input boxes 112-120 into the desired position within the items displayed in the input box 124. In some implementations, the user can place the tokens in the input box 124 by indicating a position (e.g., pointing, clicking), and then selecting a field name from a list (e.g., a pop-up menu). In some implementations, designated characters can be used to delimit tokens. For example, curly braces can be used to delimit the field names associated with tokens, and the user could enter the string, "I wish I owned a {Year} {Make} {Model}." In such an example, the user can edit both the unstructured text and the tokens entirely from a keyboard.

When the user selects the toggle button 132 again, the database message builder interface 102 toggles out of token editing mode, and returns the database message builder interface 102 to the text editing mode as illustrated in FIG. 1. When in the text editing mode, the tokens 212-220 are replaced by the string content stored in the fields they represent for a given record of the database. In the example of FIG. 1, the user is looking at a record containing information about a 1979 Cadillac Phaeton, and the token 216 is replaced by the structured text string "Phaeton", which is held in the "Model" field of the currently displayed record. Similarly, the token 220 is replaced by the structured text string "Dec. 6, 2007" which is held by the "Purchase date" field of the currently displayed record.

In some implementations, the user can browse through multiple database records, and the database message builder interface 102 can update some or all of the tokens 212-220 with the structured text from the currently selected record, thereby providing a combined collection of structured and unstructured text that is based upon the fields of a given database record, and this combined collection may in turn be submitted to the selected application or network resource. In some implementations, the user can select a database record other than the one currently shown, or a record not shown at all, from which structured text can be retrieved. For example, the user may be provided with a record number selector that the user can manipulate to identify the desired record without requiring that the selected record be displayed.

In some implementations, the database message builder interface 102 can present the user with a preset string in the input box 124. For example, one or more preconfigured combinations of the tokens 212-220 and the unstructured text may be associated with the database user interface 100 or the selected database, and one of these combinations can be presented to the user when the database message builder button 122 is selected.

In some implementations, the user can edit the combination of the tokens 212-220 and the unstructured text, and save the combination as a preset string associated with a selected database. For example, the combination of the tokens 212-220 and the unstructured text may only make sense in the context of the selected car collection database, therefore the combination may be saved in association with that database. In another example, the user may also have a database of aircraft, and a preset string such as "Alyx flew through the sky in a [Make] [Model] in [Year]." Such a preset string would make sense in the context of the aircraft database (e.g., "Alyx flew through the sky in a Boeing 747 in 2009.") but not in the context of the car collection database (e.g., "Alyx flew through the sky in a Cadillac Phaeton in 1972."). In such an example, it can be advantageous to save the preset string in association with the aircraft database but not in association with the car collection database.

Example Process Flow

Figure 3:
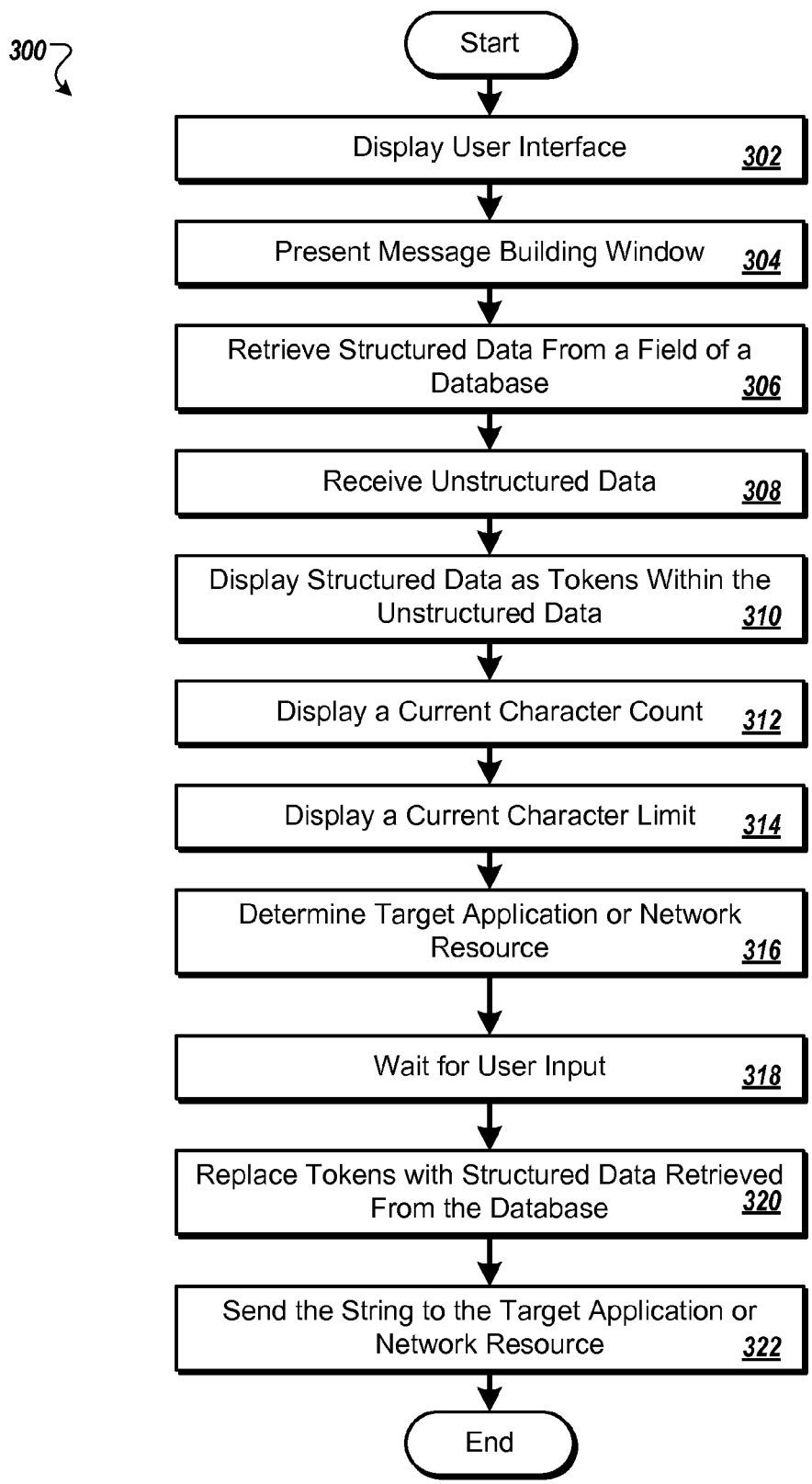
FIG. 3 is a flow diagram of an example method for building and sending a database message.

FIG. 3 is a flow diagram of an example method 300 for building and sending a database message. The method 300 can start when a user interface is displayed 302. In some implementations, the user interface can be the database application user interface 100 of FIGS. 1 and 2. A message building window is then presented 304 to the user. For example, the database message builder interface 102 can be displayed in response to a user input such as a press of the database message builder button 122. Alternatively, database message builder functionality can be accessed through an API.

Structured data can be retrieved 306 from one or more fields of a database. Examples of such databases have been discussed in relation to FIGS. 1 and 2, and additional examples of such databases will be discussed in the description of FIG. 4. Unstructured data can be received 308 by the message building window, for example, by the user entering character strings into a text input control such as the input box 124. The structured data can be displayed 310 as tokens within the unstructured data. In some implementations, the tokens may appear as visual placeholders within the unstructured data. For example, a token that represents a database field intended to hold a person's first name can be placed within a string of unstructured text, such as, "This database record refers to {First Name}."

A current character count can be displayed 312. The current character count is a count of the characters received as unstructured data plus a count of the characters retrieved as structured data from a field of the database (e.g., the field displayed as tokens). For example, the previously described string of structured and unstructured data, "This database record refers to {First Name}," includes 32 characters, spaces, and punctuation marks, and this number can be added to a count of the characters included in a database entry for the "First Name" field (e.g., a field that stores the string "Bob" would add three additional characters to the count).

A current character limit can also be displayed 314. In some implementations, the current character limit can be a number that indicates the maximum number of characters that may be used in the database message. In some implementations, the current character limit can reflect limits imposed by applications or network resources. For example, the Twitter service allows users to submit "tweets" of 140 characters or less. In another example, SMS messaging standards allow for messages of 160 characters or less. These limits or other values can then be displayed as the current character limit.

A target application or network resource can be determined 316. For example, the determination can be made when the user uses the selector control 126 to choose a target application (e.g., email, instant messaging, word processing) or network resource (e.g., social network, blog). In some implementations, an updated current character limit can be displayed when a target is determined. For example, when the user targets a different application or network resource, the newly selected target may be associated with a different character limit than was the previous target, and the different character limit can be displayed to reflect the character limit associated with the newly selected target.

The method 300 can then wait 318 for user input. For example, some or all of the steps 302-316 may be performed or repeated until the user presses the toggle button 132, thereby switching the database message builder interface 102 from the token editing mode to the text editing mode. When the user input is received, the displayed tokens are replaced 320 with structured data retrieved from the database. In the example of the previously described string of structured and unstructured data, "This database record refers to {First Name}," the token "{First Name}" can be replaced by the content included in a field of a record of the database, such as "Bob." In this example, the resulting string would be displayed as, "This database record refers to Bob."

In some implementations, when the tokens are replaced with structured data retrieved from the database, the current character count can be updated and displayed. For example, the string, "This database record refers to Bob," includes 32 characters of unstructured data and 3 characters of structured data, for a total of 35 characters, and in this example the number "35" can be displayed 314 as the current character count in the counter indicator 130.

The resulting message (in this example a text string) of structured and unstructured data is then sent 322 to the target application or network resource. In some implementations, the message can be sent in response to a user input, such as the user pressing the activation button 128. For example, by pressing the activation button 128, combined structured and unstructured data (e.g., "This database record refers to Bob," "Alyx bought a 1979 Cadillac Phaeton from Tom's Junk Yard on Dec. 6, 2007") can be posted directly to a social networking site, an email, a blog, or to other types of applications and network resources. Once the data is sent, a response can be received from the target application or network resource, which can then be handled by the database message builder application. For example, a response can be a confirmation that the database message was successfully received, an error, the data and time that the database message was accepted, etc.

In some implementations, the database message builder can automatically cycle through and send out database messages for each database record. For example, a user can click a button that says "Twitter All Records." The database message builder can then automatically send the constructed message(s) for each database record.

Example Database Structure

Figure 4:
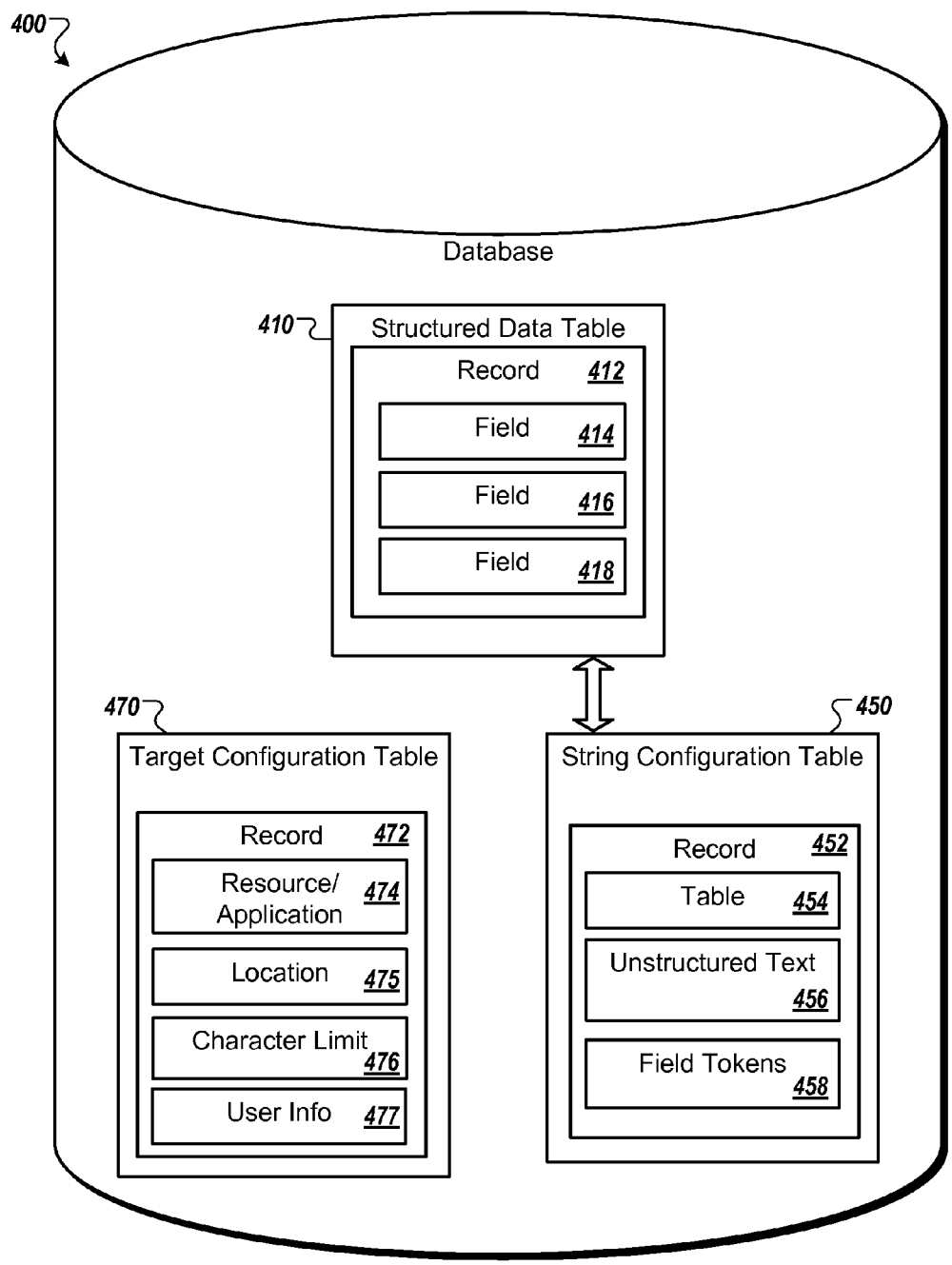
FIG. 4 is a block diagram of an example database.

FIG. 4 is a block diagram of an example database 400. In some implementations, the database 400 can be an integrated collection of logically related records or files consolidated into a common pool that provides data for one or more users. For example, the database 400 can be structured as a relational database, hierarchical database, a network database, an XML file, a text file, a delimited file (e.g., tab-delimited, CSV), or other type of collection of data.

In general, the database 400 can be structured as a collection of tables, wherein each table includes a collection of records that represent a collection of related data, and the records within a table can share a common collection of fields for storing datum. For example, in a table structured to represent a collection of personal contacts, each record can represent a single person. The fields can represent attributes like first name, last name, street address, phone number, or other information about the person. The database 400 can include a structured data table 410, a string configuration table 450, and a target configuration table 470.

The structured data table 410 can include a collection of one or more records, such as a record 412. The record 412 includes a collection of fields 414-418. In some implementations, fields 414-418 can be implemented and arranged by the user to store a collection of related data. For example, the structured data table 410 can be designed to store information about a car collection (e.g., as was illustrated in the example of FIG. 1), wherein each record represents a car in the collection. The fields 414-418 can store information such as the make, model, year, or other information that may be associated with a car in a collection.

The string configuration table 450 can include one or more records such as a record 452. In some implementations, the record 452 can store a preset string of structured and unstructured data. For example, the record 452 includes a table field 454, an unstructured text field 456, and a field token field 458. The table field 454 can include information that associates the record and the preset string with a particular table of structured data, such as the table 410. In some implementations, by associating the record 452 with the table 410, the preset string described by the content of the record 452 can be made available for use in the database message builder interface 102 of FIGS. 1 and 2 only in the context of the table 410. The unstructured text field 456 can include the unstructured text portion of the preset string, and the field tokens field 458 can include information about the fields and/or placement of structured data within the unstructured text portion of the preset string.

In some example, the field tokens field 458 can be implemented as one or more sub-tables of the string configuration table 450, wherein each record of the sub-table can represent a single token and token placement location within a preset string. In other implementations, the tokens that represent structured data can be combined with the unstructured text in a single field. For example, tokens representing the car collection database fields "year," "make," and "model" can be represented as character delimited substrings within a preset string of unstructured text such as, "Alyx owns a <Year> <Make> <Model>."

The target configuration table 470 can store information about target applications and network resources. The target configuration table 470 can include one or more records, such as a record 472 that represents a single application or network resource. The record 472 can include a resource or application identifier field 474 to store the name of a target network resource or application. For example, the resource or application identifier field 474 can store values such as "Twitter" or "Apple Mail."

A location field 475 can store an address or file location for the network resource or application. For example, the location field 475 can store values such as "http://www.twitter.com" or "/Mac HD/Applications/applemail". A character limit field 476 can be included to store a number that can describe the maximum number of characters that the network resource or application can permit. For example, the character limit field 476 can store the number "140" in association with the "Twitter" service, or may store no value or a reserved value (e.g., zero, −1) for targets that do not define a maximum character count such as email applications.

A user information field 477 is included to store user name, password, or other information. In some implementations, the data stored in the user information field 477 can be used to log into a network resource or application, and post combined strings of structured and unstructured text under the user's identity.

Example Computer Architecture for Data Message Builder

Figure 5:
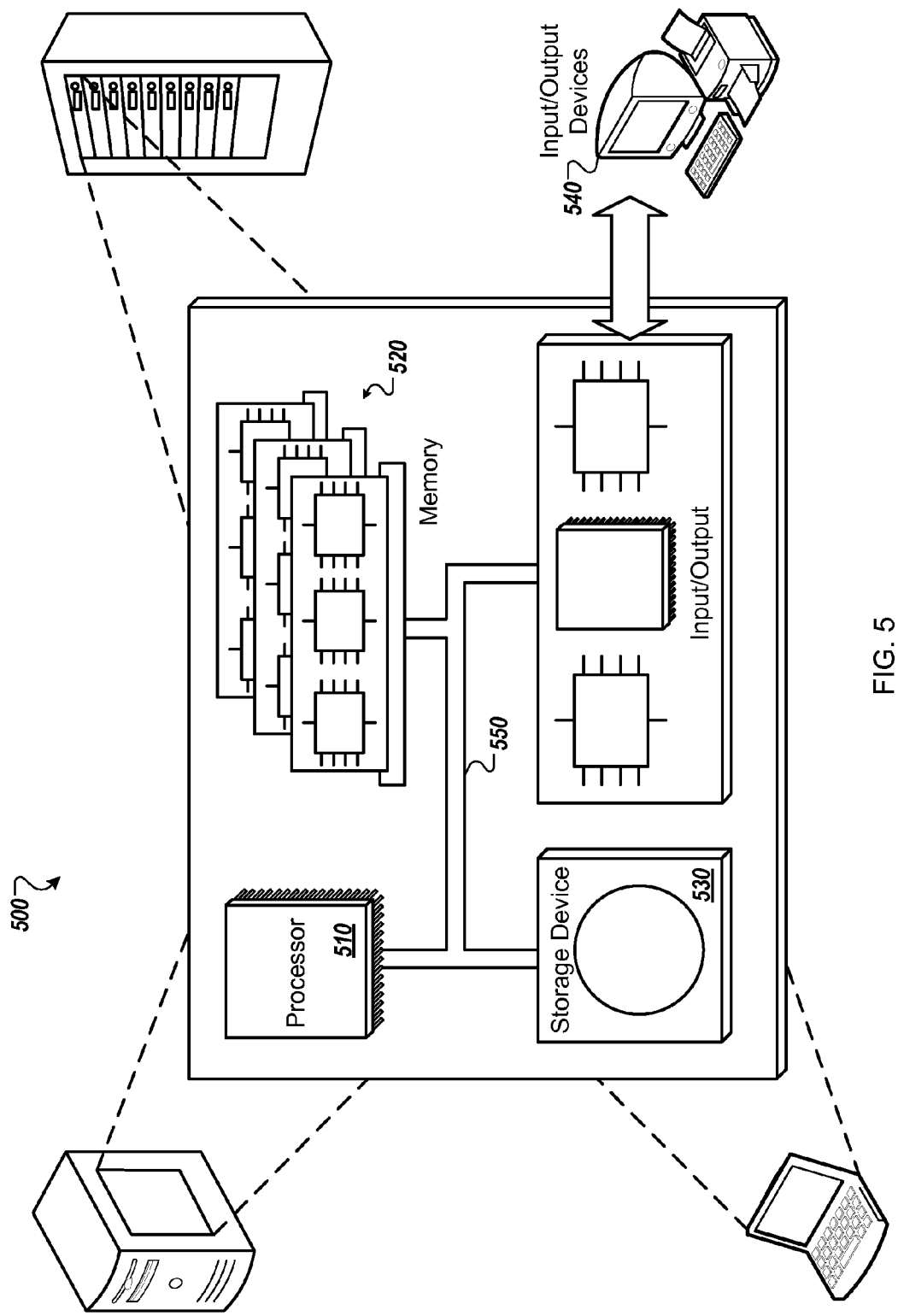
FIG. 5 is a schematic diagram of an example of a generic computer system.

FIG. 5 is a schematic diagram of an example of a generic computer system 500. The system 500 can be used for the operations described in association with the method 300 according to one implementation. For example, the system 500 may be included in either or all of a computer executing the database application user interface 100, the process 300, or the database 400. The system 500 can be included in a personal computer, mobile phone, email device, media player, electronic tablet, website server (in the cloud) or any other computing device.

In some implementations, the system 500 can include a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540. In some implementations, the system 500 can include multiple processors or processing cores.

The memory 520 can store information within the system 500. In one implementation, the memory 520 can be a computer-readable medium. In one implementation, the memory 520 can be a volatile memory unit. In another implementation, the memory 520 can be a non-volatile memory unit.

The storage device 530 can be capable of providing mass storage for the system 500. In one implementation, the storage device 530 can be a computer-readable medium. In various different implementations, the storage device 530 can be a CD ROM, DVD, a hard disk device, an optical disk device, or a tape device.

The input/output device 540 provides input/output operations for the system 500. In one implementation, the input/output device 540 can include a keyboard and/or pointing device. In another implementation, the input/output device 540 can include a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer-implemented method performed by one or more computer processors for database message building, comprising:
    displaying, through a user interface of a computer system, both an item window including structured data associated with at least one field of a record selected in a database and a message building window separate and distinct from the item window;
    receiving, from a user, unstructured data through the message building window and at least one selection of the structured data through the item window; and
    displaying a message in the message building window, the message including the unstructured data combined with a token representing the at least one selected structured data; wherein
    the message building window enables the user to publish the displayed message to an external source; and
    the receiving the at least one selection of the structured data through the item window further comprises:
        determining the user dragged the field in the item window to the message building window at a specific position; and
        populating the message building window with the token representing the selected structured data at the specified position.

2. The method of claim 1, where the unstructured data includes text entered by the user operating an input device of the computer system.

3. The method of claim 1, wherein enabling the user to publish the displayed message to an external source further comprising:
    receiving a first input selecting a target application or network resource;
    receiving a second input specifying an intent to publish the message on the selected target application or network resource;
    responsive to the second input, replacing the token with structured data retrieved from a field of the database record corresponding to the token; and
    sending the message, including the retrieved structured and received unstructured data, to the target application or network resource for publishing.

4. The method of claim 3, further comprising:
    displaying a current character count or character limit for the selected target application or network resource.

5. The method of claim 3, where the target network resource is a website.

6. The method of claim 3, where the target application is an email application.

7. The method of claim 1, where displaying the message in the message building window further comprises:
    displaying a preset text string in the message building window;
    receiving input specifying an edit to the preset text string; and
    editing the preset text string based on the input.

8. The method of claim 1, further comprising:
    receiving input specifying a field to be added to the message building window; and
    displaying a token in the message building window representing the specified field.

9. The method of claim 1, further comprising:
    saving the structured and unstructured data on the computer system, where saving includes associating the structured and unstructured data with a data collection of the database.

10. The method of claim 1, further comprising:
saving the token and unstructured data on the computer system as a preset text string, where saving includes associating the token and unstructured data with a data collection of the database.

11. A non-transitory computer-readable storage medium for database message building having instructions stored thereon, which, when executed by a computer processor, causes the processor to perform operations, comprising:
displaying, through a user interface of a computer system, both an item window including structured data associated with at least one field of a record selected in a database and a message building window separate and distinct from the item window;
receiving, from a user, unstructured data through the message building window and at least one selection of the structured data through the item window; and
displaying a message in the message building window, the message including the unstructured data combined with a token representing the at least one selected structured data; wherein
the message building window enables the user to publish the displayed message to an external source; and
the receiving the at least one selection of the structured data through the item window further comprises:
determining the user dragged the field in the item window to the message building window at a specific position; and
populating the message building window with the token representing the selected structured data at the specified position.

12. The computer-readable medium of claim 11, where the unstructured data includes text entered by the user operating an input device of the computer system.

13. The computer-readable medium of claim 11, wherein enabling the user to publish the displayed message to an external source further comprising:
receiving a first input selecting a target application or network resource;
receiving a second input specifying an intent to publish the message on the selected target application or network resource;
responsive to the second input, replacing the token with structured data retrieved from a field of the database record corresponding to the token; and
sending the message, including the retrieved structured and received unstructured data, to the target application or network resource for publishing.

14. The computer-readable medium of claim 13, further comprising:
displaying a current character count or character limit for the selected target application or network resource.

15. The computer-readable medium method of claim 13, where the target network resource is a website.

16. The computer-readable medium of claim 13, where the target application is an email application.

17. The computer-readable medium of claim 11, where displaying the message in the message building window further comprises:
displaying a preset text string in the message building window;
receiving input specifying an edit to the preset text string; and
editing the preset text string based on the input.

18. The computer-readable medium of claim 11, further comprising:
receiving input specifying a field to be added to the message building window; and
displaying a token in the message building window representing the specified field.

19. The computer-readable medium of claim 11, further comprising:
saving the structured and unstructured data on the computer system, where saving includes associating the structured and unstructured data with a data collection of the database.

20. The computer-readable medium of claim 11, further comprising:
saving the token and unstructured data on the computer system as a preset text string, where saving includes associating the token and unstructured data with a data collection of the database.

21. A database message building system, comprising:
a computer processor,
a computer memory coupled to the processor and storing instructions, which, when executed by the processor, causes the processor to perform operations comprising:
displaying, through a user interface of a computer system, both an item window including structured data associated with at least one field of a record selected in a database and a message building window separate and distinct from the item window;
receiving, from a user, unstructured data through the message building window and at least one selection of the structured data through the item window; and
displaying a message in the message building window, the message including the unstructured data combined with a token representing the at least one selected structured data; wherein
the message building window enables the user to publish the displayed message to an external source; and
the receiving the at least one selection of the structured data through the item window further comprises:
determining the user dragged the field in the item window to the message building window at a specific position; and
populating the message building window with the token representing the selected structured data at the specified position.

22. A computer-implemented method performed by one or more computer processors for database message building, comprising:
displaying, through a user interface of a computer system, both an item window including structured data associated with at least one field of a record selected in a database and a message building window separate and distinct from the item window;
receiving text input from a user through the message building window;
retrieving tokens specified by the user through the item window, the tokens representing structured data selected by the user and associated with the selected database record;
displaying a string in the message building window, the string including a combination of the text input and the tokens, wherein
the message building window enables the user to publish the displayed string to an external source; and
the retrieving tokens specified by the user through the item window further comprises:
in response to the user indicating a specific position in the message building window, displaying field names for the at least one field in the item window; and populating the message building window with the tokens at the specific location of the message window in response to a selection of a field name.

23. The method of claim 22, wherein enabling the user to publish the displayed string to an external source further comprising:

receiving input through the user interface specifying publication of the message displayed in the message building window; and responsive to the input, publishing the message to a user specified target application or network resource.

24. The method of claim 23, further comprising:

displaying a current character count or character limit in the user interface for the specified target application or network resource.

* * * * *

UNITED STATES PATENT AND TRADEMARK OFFICE
CERTIFICATE OF CORRECTION

PATENT NO. : 8,423,582 B2
APPLICATION NO. : 12/687026
DATED : April 16, 2013
INVENTOR(S) : Ryan Griggs It is certified that error appears in the above-identified patent and that said Letters Patent is hereby corrected as shown below:

In the Claims:

In Column 10, Line 19, In Claim 1, before "receiving" delete "the".

In Column 11, Line 25, In Claim 11, before "receiving" delete "the".

Signed and Sealed this
Second Day of July, 2013

Teresa Stanek Rea
*Acting Director of the United States Patent and Trademark Office*